(12) United States Patent
Tulett et al.

(10) Patent No.: US 9,353,788 B1
(45) Date of Patent: May 31, 2016

(54) BEARING APPARATUSES AND MOTOR ASSEMBLIES USING SAME

(75) Inventors: Nathan A. Tulett, Orem, UT (US); Brigham J. Kindell, Spanish Fork, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 617 days.

(21) Appl. No.: 13/480,932

(22) Filed: May 25, 2012

(51) Int. Cl.
*F16C 33/00* (2006.01)
*F16C 17/02* (2006.01)
*F16C 33/12* (2006.01)

(52) U.S. Cl.
CPC .............. *F16C 17/02* (2013.01); *F16C 33/121* (2013.01)

(58) Field of Classification Search
CPC .......... F16C 17/02; F16C 17/04; F16C 17/26; F16C 33/121; F16C 2206/04; F16C 2352/00
USPC ............. 384/92, 95, 129, 226, 228, 276, 282, 384/297, 425
See application file for complete search history.

(56) References Cited

U.S. PATENT DOCUMENTS

| | | | |
|---|---|---|---|
| 5,593,234 A | 1/1997 | Liston | |
| 6,340,245 B1 | 1/2002 | Horton et al. | |
| 6,655,845 B1 | 12/2003 | Pope et al. | |
| 7,559,695 B2 * | 7/2009 | Sexton et al. | 384/95 |
| 7,665,898 B2 | 2/2010 | Pope et al. | |
| 7,845,436 B2 | 12/2010 | Cooley et al. | |
| 7,866,418 B2 | 1/2011 | Bertagnolli et al. | |
| 7,870,913 B1 | 1/2011 | Sexton et al. | |
| 8,069,933 B2 | 12/2011 | Sexton et al. | |
| 8,277,124 B2 | 10/2012 | Sexton et al. | |
| 8,616,770 B2 | 12/2013 | Sexton et al. | |
| 2012/0057814 A1* | 3/2012 | Dadson et al. | 384/129 |
| 2013/0156357 A1* | 6/2013 | Peterson et al. | 384/368 |
| 2014/0072249 A1 | 3/2014 | Sexton et al. | |

OTHER PUBLICATIONS

U.S. Appl. No. 11/545,929, filed Oct. 26, 2006, Bertagnolli et al.
U.S. Appl. No. 13/166,007, filed Jun. 22, 2011, Chapman et al.

* cited by examiner

*Primary Examiner* — James Pilkington
(74) *Attorney, Agent, or Firm* — Dorsey & Whitney LLP

(57) ABSTRACT

In an embodiment, a bearing apparatus includes a first bearing assembly including a plurality of first superhard bearing elements. The bearing apparatus further includes a second bearing assembly including a plurality of second superhard bearing elements generally opposing and bearing against the plurality of first superhard bearing elements of the first bearing assembly during operation. A support ring carries the plurality of second superhard bearing elements that are distributed circumferentially about an axis. More than one of the plurality of second superhard bearing elements includes an outer convex peripheral surface that is substantially cylindrical and exhibits a convex curvature, and a cutout at least partially defined by a concave peripheral surface that is substantially cylindrical and curved to generally correspond to the convex curvature of the outer convex peripheral surface. The cutout receives an adjacent one of the plurality of superhard bearing elements.

21 Claims, 15 Drawing Sheets

US 9,353,788 B1

BEARING APPARATUSES AND MOTOR ASSEMBLIES USING SAME

BACKGROUND

Subterranean drilling systems that employ downhole drilling motors are commonly used for drilling boreholes in the earth for oil and gas exploration. Such subterranean drilling systems typically include a housing enclosing a downhole drilling motor operably connected to an output shaft. One or more thrust-bearing apparatuses may also be operably coupled to the downhole drilling motor for carrying thrust loads generated during drilling operations. A rotary drill bit may also be connected to the output shaft and be configured to engage a subterranean formation and drill a borehole.

Each bearing apparatus may include a stator that does not rotate and a rotor that is attached to the output shaft and rotates with the output shaft. The stator and rotor may each include a plurality of superhard bearing elements or inserts. Each superhard bearing element may be fabricated from a polycrystalline diamond compact ("PDC") that provides a bearing surface that bears against other bearing surfaces during use.

In a conventional PDC bearing apparatus, a bearing assembly may include a support ring that may be configured to accept a number of superhard bearing elements. The superhard bearing elements may be made from a polycrystalline diamond layer formed on a cemented tungsten carbide substrate.

Despite the availability of a number of different bearing assembly designs, manufacturers and users of bearing apparatuses continue to seek improved bearing apparatus designs and manufacturing techniques.

SUMMARY

Embodiments of the invention relate to bearing apparatuses that include superhard bearing elements having geometries tailored for streamlined manufacturing and efficient positioning thereof in bearing assemblies used in the bearing apparatuses. The disclosed bearing apparatuses may be used in a variety of applications, such as drilling equipment, machining equipment, bearing apparatuses, and other articles.

In an embodiment, a bearing apparatus includes a plurality of first superhard bearing elements each of which includes a first superhard bearing surface. The bearing apparatus further includes a second bearing assembly including a plurality of second superhard bearing elements generally opposing and bearing against the plurality of first superhard bearing elements of the first bearing assembly during operation. A support ring carries the plurality of second superhard bearing elements that are distributed circumferentially about an axis. More than one of the plurality of second superhard bearing elements includes a second superhard bearing surface and an outer convex peripheral surface that is substantially cylindrical and exhibits a convex curvature, and a cutout at least partially defined by a concave peripheral surface that is substantially cylindrical and curved to generally correspond to the convex curvature of the outer convex peripheral surface. The cutout receives an adjacent one of the plurality of second superhard bearing elements.

In an embodiment, a method of operating a bearing apparatus includes rotating a first bearing assembly relative to a second bearing assembly, wherein at least one of the first or second bearing assembly includes a support ring and a plurality of superhard bearing elements carried by the support ring. More than one of the plurality of superhard bearing elements includes a superhard bearing surface that bears against another bearing surface, an outer convex peripheral surface that is substantially cylindrical and exhibits a convex curvature, and a cutout at least partially defined by a concave peripheral surface that is substantially cylindrical and curved to generally correspond to the convex curvature of the outer convex peripheral surface. The cutout receives an adjacent one of the plurality of superhard bearing elements.

In an embodiment, a motor assembly for use in drilling subterranean formations includes a motor operable to apply torque to a rotary drill bit, the motor operably coupled to a bearing apparatus, the bearing apparatus including a rotor and a stator. At least one of the stator or the rotor includes a support ring and a plurality of superhard bearing elements carried by the support ring. More than one of the plurality of superhard bearing elements includes a superhard bearing surface that bears against another bearing surface during operation, an outer convex peripheral surface that is substantially cylindrical and exhibits a convex curvature, and a cutout at least partially defined by a concave peripheral surface that is substantially cylindrical and curved to generally correspond to the convex curvature of the outer convex peripheral surface. The cutout receives an adjacent one of the plurality of superhard bearing elements.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments of the invention relate to bearing apparatuses, methods of operating bearing apparatuses, and motor assemblies for use in drilling subterranean formations that include superhard bearing elements having geometries tailored for streamlined manufacturing and efficient positioning thereof in bearing apparatuses and motor assemblies. The disclosed bearing apparatuses, methods of using bearing apparatuses and motor assemblies may be used in a variety of applications, such as drilling equipment, machining equipment, pumps, bearing apparatuses, and other articles.

Figure 1A:
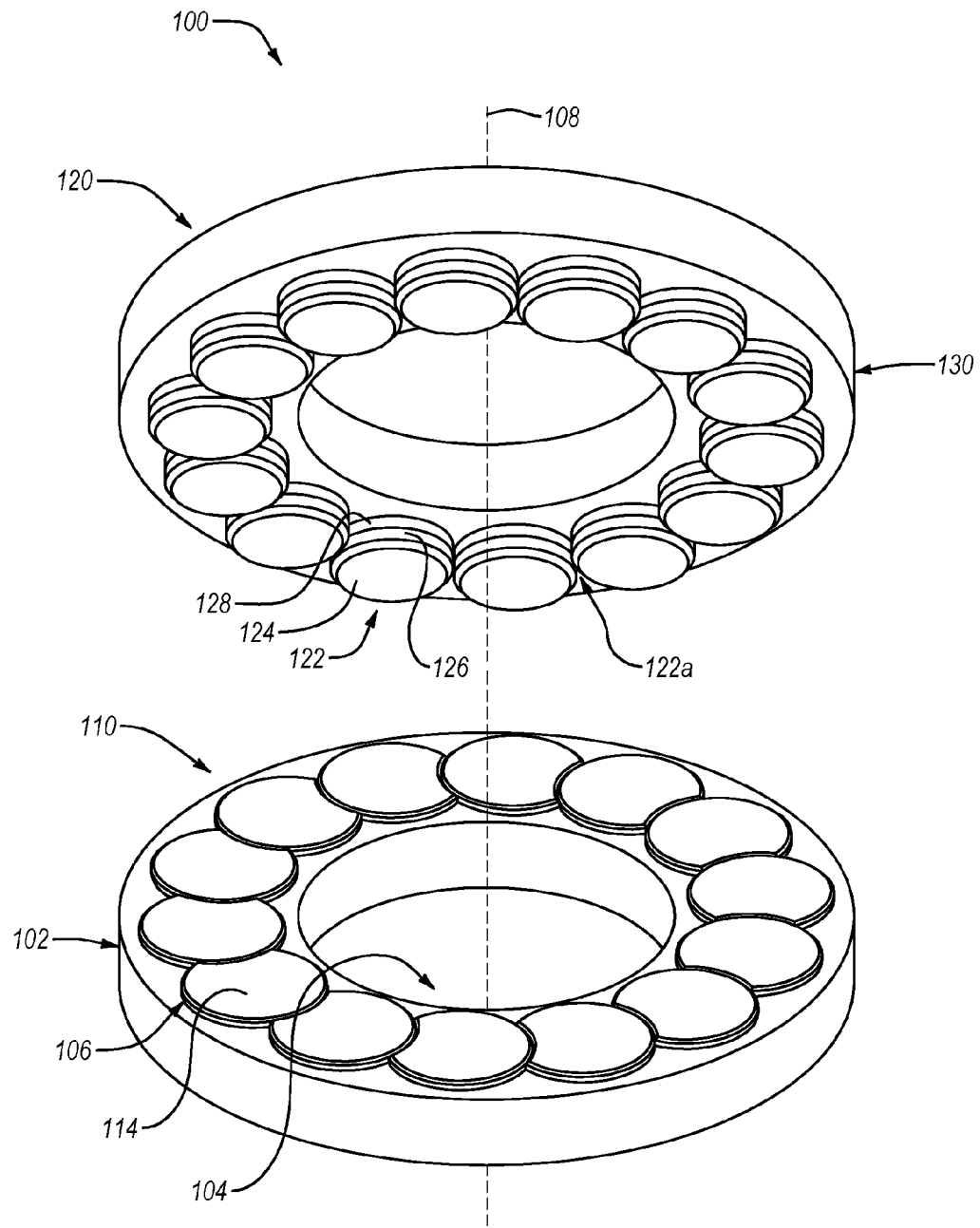
FIGS. 1A-1C are exploded isometric views of thrust-bearing apparatuses according to various different embodiments.

FIG. 1A is an exploded isometric view of a thrust-bearing apparatus according to an embodiment. The thrust-bearing apparatus 100 may include a rotor 120 and a stator 110. The terms "rotor" and "stator" refer to rotating and stationary portions of a thrust-bearing apparatus, respectively, and, therefore, the terms "rotor" and "stator" may refer to similar or identical structures configured to rotate and remain stationary, respectively.

The rotor 120 may include a plurality of circumferentially-adjacent superhard bearing elements 122. Each of the superhard bearing elements 122 may include a superhard bearing surface 124. In the embodiment illustrated in FIG. 1A the superhard bearing elements 122 may be superhard compacts (e.g., PDCs), which include a superhard table 126 of superhard material (e.g., polycrystalline diamond) bonded to a substrate 128 (e.g., a cobalt-cemented tungsten carbide substrate). The term "superhard," as used herein, means a material having a hardness exceeding a hardness of tungsten carbide. Any superhard material may be used, such as polycrystalline diamond, silicon carbide, a silicon carbide/polycrystalline diamond composite, polycrystalline cubic boron nitride, polycrystalline cubic boron nitride and polycrystalline diamond, silicon carbide and polycrystalline boron nitride mixed with polycrystalline diamond, or any other suitable superhard material.

Additionally, the superhard bearing elements 122 may have other configurations than the illustrated configuration shown in FIG. 1A. For example, the superhard bearing elements 122 may have a convex or concave bearing surface 124, or another configuration designed for a particular bearing application. In other embodiments, the superhard bearing elements 122 may be generally trapezoidal, generally wedge-like shaped, generally oval, combinations thereof, or the like. In yet other embodiments, the superhard bearing elements 122 may exhibit, for example, the general configuration of the superhard bearing elements 106 of the stator 110 as shown in FIG. 1A, or any other superhard bearing element embodiment disclosed herein.

In an embodiment, the superhard bearing elements 122 are spaced from each other by a respective gap 122a having a dimension of, for example, about 5.1 μm to about 510 μm (about 0.00020 inches to about 0.020 inches). For example, the gap 122a may separate adjacent superhard bearing elements 122 by a distance of about 2.5 μm to about 5.1 mm (about 0.00010 inches to about 0.200 inches), about 5.1 μm to about 2.5 mm (about 0.00020 inches to about 0.100 inches), or about 130 μm to about 250 μm (about 0.005 inches to about 0.01 inches), although the separation distance may be greater or smaller. For instance, as the size of the bearing assembly 120 increases, the size of the superhard bearing elements 122 and/or the size of the respective gap 122a may also increase.

In an embodiment, the superhard bearing elements 122 may be mounted in corresponding recesses (not shown) of a support ring 130. For example, the superhard bearing elements 122 may be secured in corresponding recesses via brazing, soldering, using at least one fastener, or combinations thereof.

The stator 110, as shown in FIG. 1A, may include a support ring 102 defining an opening 104 and a plurality of superhard bearing elements 106, with each of the superhard bearing elements 106 having a bearing surface 114. The superhard bearing elements 106 may be moon-shaped or crescent shaped, and may be configured, recessed, and positioned on the support ring 102 to collectively define a substantially continuous superhard bearing surface. The configuration of the plurality of superhard bearing elements 106 enables efficient manufacturing and packing of the superhard bearing elements 106 to allow forming the substantially continuous superhard bearing surface.

As shown in FIG. 1A, the thrust-bearing apparatus 100 the superhard bearing surfaces 124 and 114 of the plurality of superhard bearing elements 106 and 122 bear against each other during use during contact operation. For example, the thrust-bearing apparatus 100 may not include intervening rolling elements between the superhard bearing surfaces 124 and 114 that can prevent direct contact therebetween, and during contact operation the superhard bearing surfaces 124 and 114 of the plurality of superhard bearing elements 106 and 122 bear against each other during use. Moreover, fatigue at the bearing contact surface between the superhard bearing elements 106 and the superhard bearing elements 122 may also be reduced because superhard bearing material does not deform as much as a traditional bearing surface (i.e., carbide or steel) due to the superhard bearing material's high modulus of elasticity. In addition, the configuration of the superhard bearing elements 106 may increase the general load capacity of the bearing assemblies serving as rotor 120 and stator 110 (or vice versa). It is noted that in other embodiments, the rotor or stator may be configured as any other described embodiments of thrust-bearing assemblies disclosed herein.

In hydrodynamic operation, high pressure drilling fluid is circulated through the drill string and power section (not shown) of the downhole drilling motor. In operation, drilling fluid or mud may be pumped between the superhard bearing surfaces 124 and 114 of the rotor 120 and stator 110. Rotation of the rotor 120 at a sufficient rotational speed causes the drilling fluid to separate bearing surfaces 114 of the stator 110 and/or the bearing surfaces 124 of the rotor 120. Because the stator 110 includes a plurality of closely-spaced superhard bearing elements 106, the fluid film may develop under certain operational conditions in which the rotational speed of the rotor 120 is sufficiently great and the thrust load is sufficiently low. Under certain operational conditions, the pressure of the fluid film is sufficient to prevent contact between the bearing surfaces 124 of the rotor 120 and the bearing surfaces 114 of the stator 110 and, thus, substantially reduce wear of the superhard bearing elements 122 and superhard bearing elements 106. When the thrust load exceeds a certain value and/or the rotational speed of the stator 110 is reduced, the pressure of the fluid film may not be sufficient to prevent the superhard bearing surfaces 124 of the rotor 120 and the superhard bearing surfaces 114 of the stator 110 from contacting each other. Under such operational conditions, the thrust-bearing apparatus 100 is not operated as a hydrodynamic bearing. Thus, under certain operational conditions, the thrust-bearing apparatus 100 may be operated as a hydrodynamic thrust-bearing apparatus and under other conditions the thrust-bearing apparatus 100 may be operated so that the superhard bearing surfaces 124 and 114 directly contact each other during use or a partially developed fluid film is present between the superhard bearing surfaces 124 and 114. However, the superhard bearing elements 122 and 106 comprising superhard materials are sufficiently wear-resistant to accommodate repetitive contact with each other, for example, as during start-up and shut-down of a subterranean drilling system employing the thrust-bearing apparatus 100 or other operational conditions not favorable for forming the fluid film.

Figure 1B:
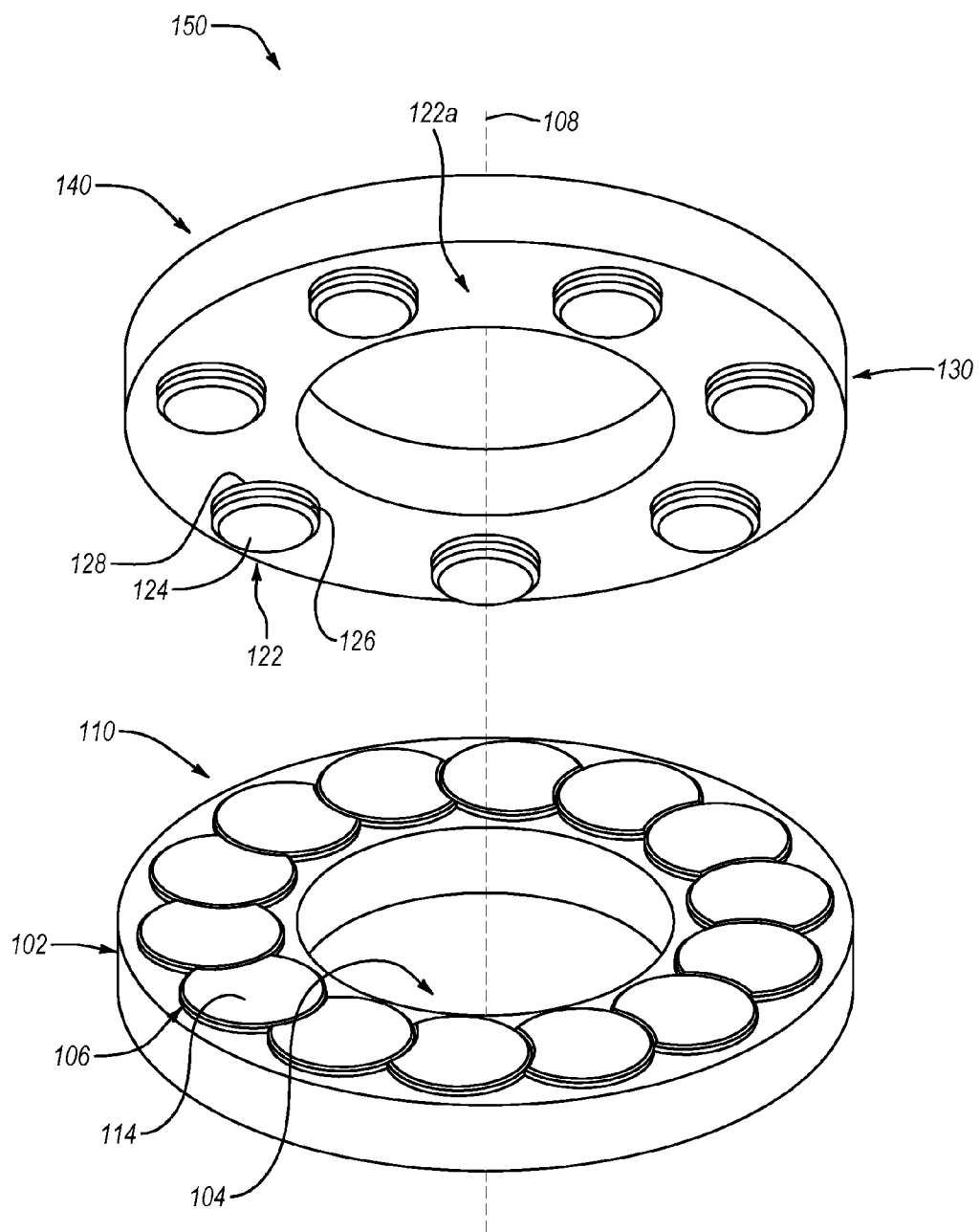

FIG. 1B is an exploded view of a thrust-bearing apparatus 150 according to another embodiment. The thrust-bearing apparatus 150 is similar to that of the thrust-bearing apparatus 100. However, the thrust-bearing assembly 150 includes a rotor 140 in which the superhard bearing elements 122 are relatively more widely spaced than that of the superhard bearing elements 122 shown in FIG. 1A. For example, the superhard bearing elements 122 may be separated from an adjacent superhard bearing element by a gap 122a having a dimension of about 7.6 mm to about 19 mm (about 0.30 inches to about 0.75 inches), such as about 10 mm to about 13 mm (about 0.40 inches to about 0.50 inches). In some embodiments, the gap 122a may be about equal to or greater than an average diameter or other lateral dimension of the superhard bearing elements 122.

Figure 1C:
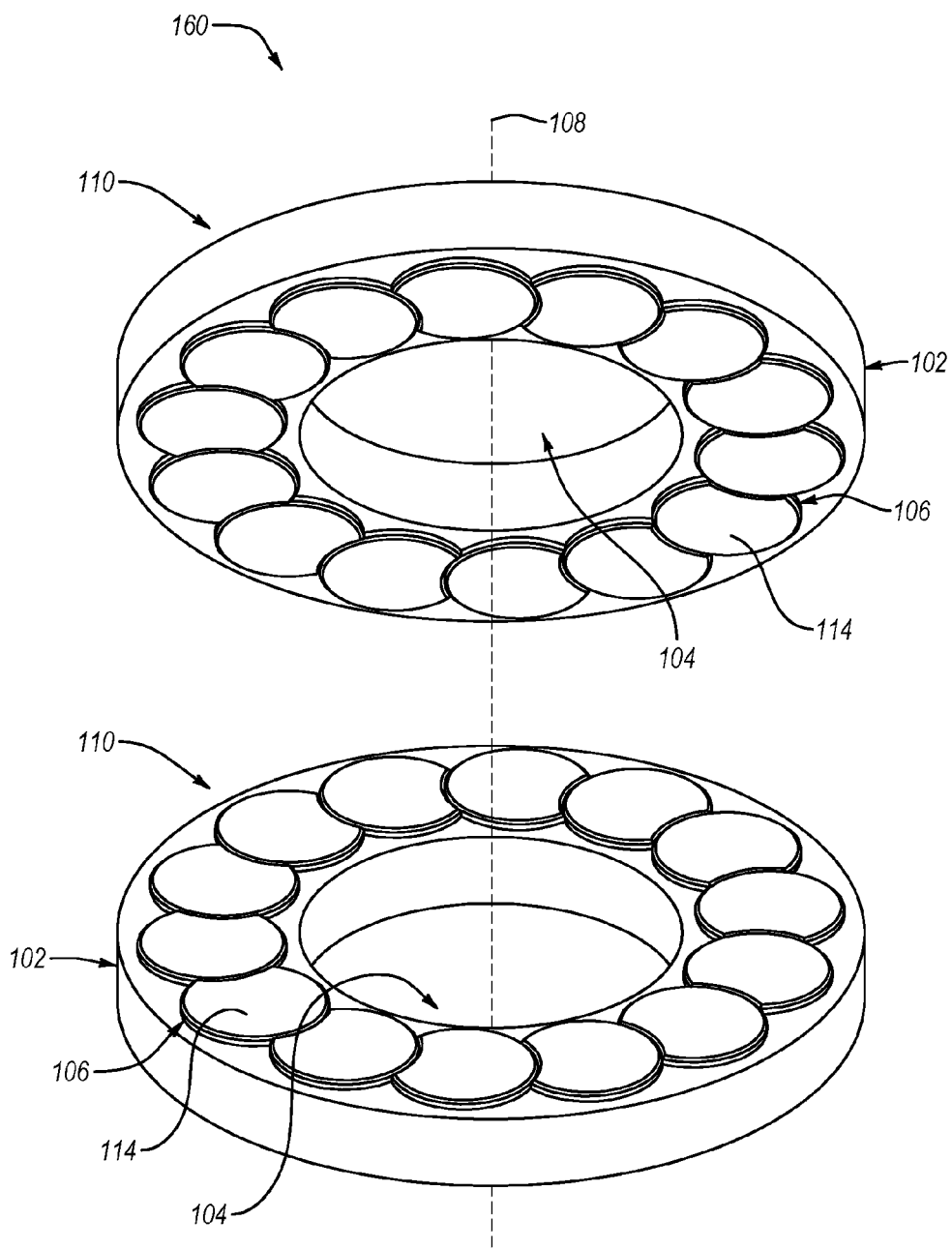

Although shown in FIG. 1A as the stator, the thrust-bearing assembly 110 may form a stator or a rotor, or as shown in FIG. 1C, both the thrust-bearing assembly stator 110 and the thrust-bearing assembly rotor 110 of a thrust-bearing apparatus used in a subterranean drilling system. Whether used as a stator 110 or a rotor 110, in the thrust-bearing apparatus 100 of FIG. 1A, or as both the stator 110 and the rotor 110 of the thrust-bearing apparatus 160, as shown in FIG. 1C, the support ring 102 of the thrust-bearing assembly 110 defines an opening 104 through which a shaft (not shown) of, for example, a down-hole drilling motor may extend. The support ring 102 may be made from a variety of different materials. For example, the support ring 102 may comprise carbon steel, stainless steel, tungsten carbide, or another suitable material. The support ring 102 may include a plurality of recesses 118 (FIG. 2B) formed therein.

Figure 2A:
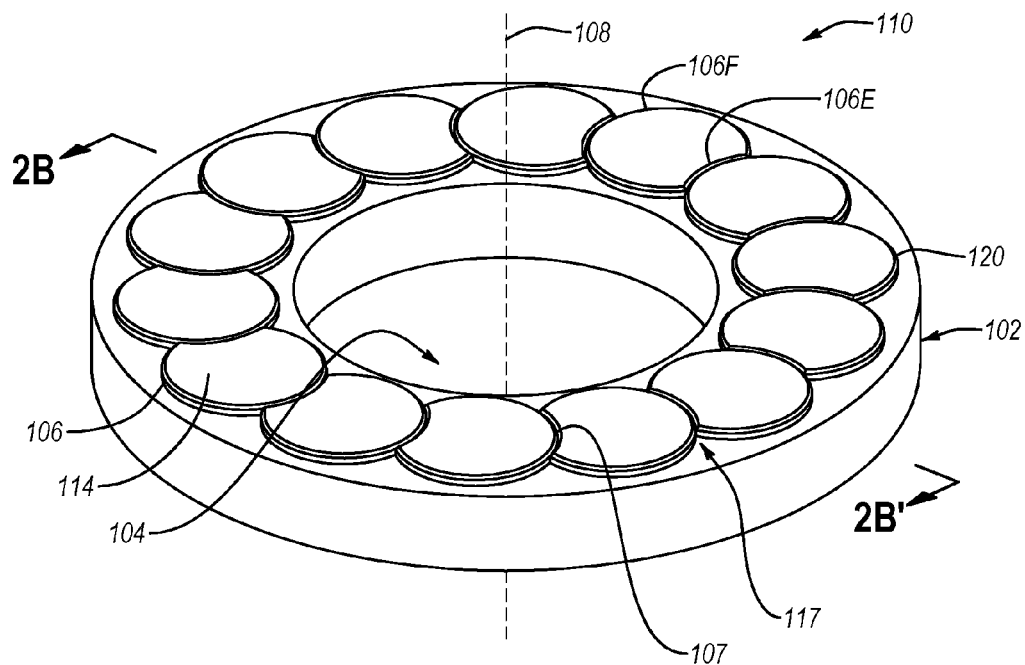
FIG. 2A is an isometric view of one of the thrust-bearing assemblies shown in FIGS. 1A-1C including nested superhard bearing elements according to an embodiment.
Figure 2B:
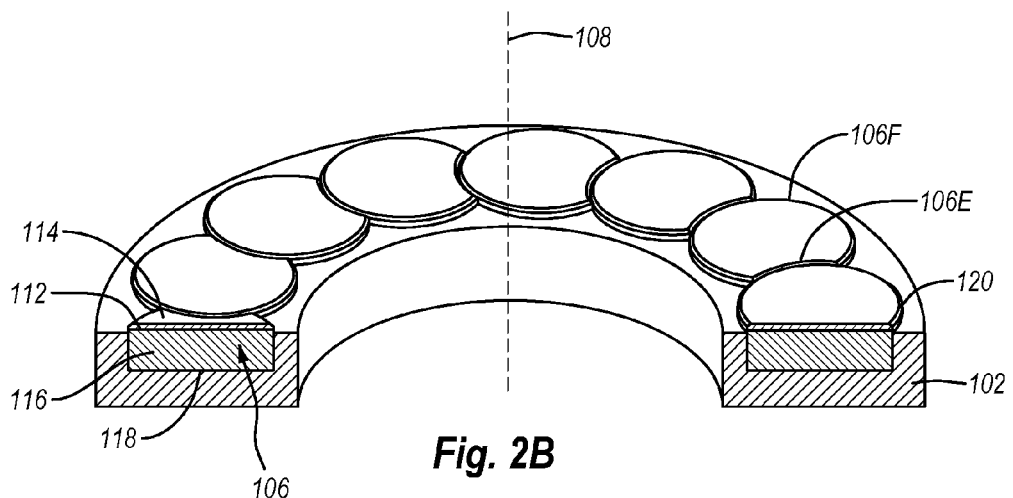
FIG. 2B is an isometric partial cross-sectional view taken along line 2B-2B' of the thrust-bearing assembly shown in FIG. 2A.
Figure 2C:
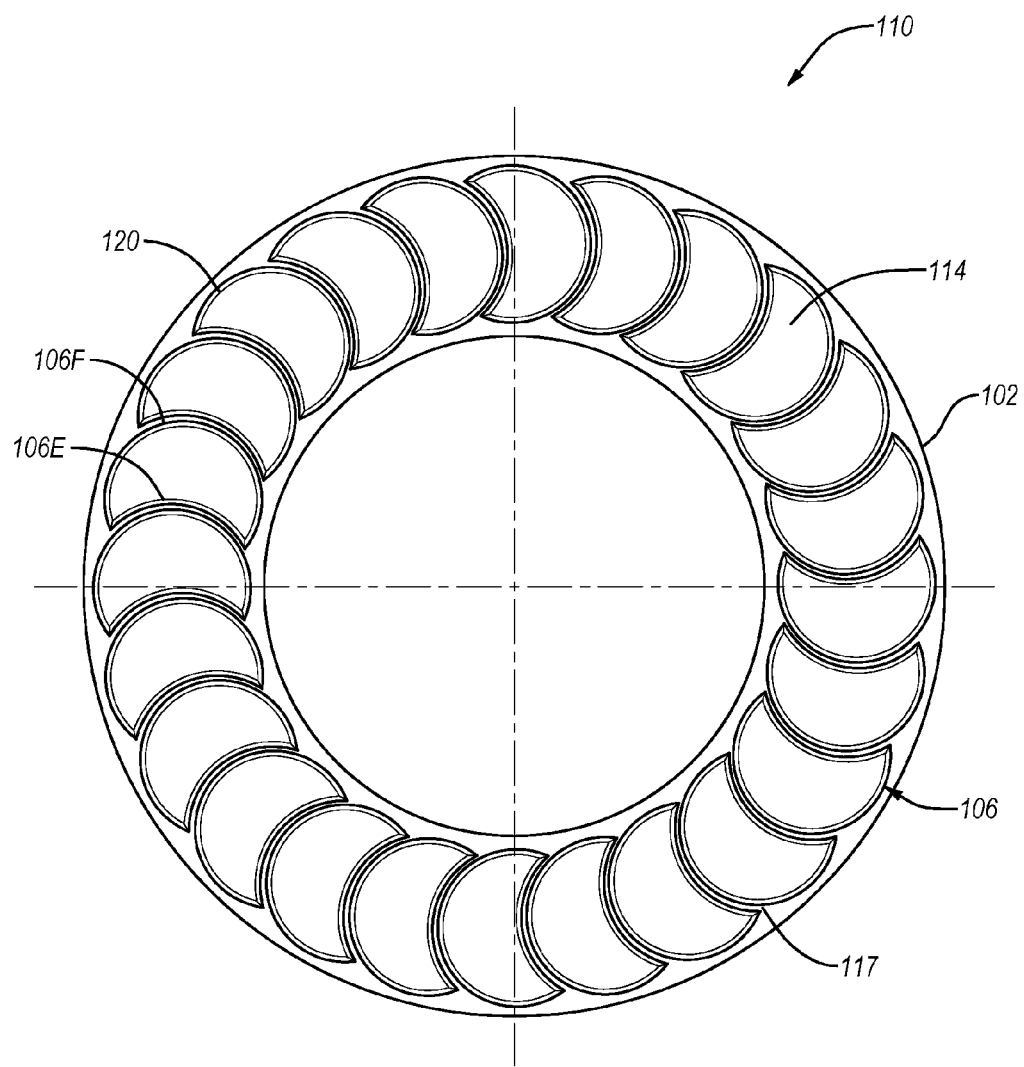
FIG. 2C is a top plan view of the thrust-bearing assembly shown in FIGS. 2A and 2B.

FIGS. 2A-2C are isometric, isometric partial cross-sectional, and top plan views of the thrust-bearing assembly 110 shown in FIGS. 1A-1C. As discussed above in reference to FIG. 1A, the plurality of superhard bearing elements 106 may be generally moon or crescent shaped for efficient packing. The superhard bearing elements 106 are illustrated in FIG. 2A as being distributed circumferentially about the thrust axis 108 along which a thrust force may be generally directed during use. Each superhard bearing element 106 may be partially disposed in a corresponding one of the recesses 118 (FIG. 2B) of the support ring 102 and secured partially therein via brazing, press-fitting, fastening with a fastener, or another suitable technique.

The superhard bearing elements 106 (or superhard bearing element 122, or any superhard bearing element disclosed herein) may be made from a number of different superhard materials, such as polycrystalline diamond, polycrystalline cubic boron nitride, silicon carbide, tungsten carbide, or any combination of the foregoing superhard materials. In an embodiment, one or more of the superhard bearing elements 106 may include polycrystalline diamond. In some embodiments, the polycrystalline diamond may be leached to at least partially or substantially completely remove a metal-solvent catalyst (e.g., cobalt, iron, nickel, or alloys thereof) that was used to sinter precursor diamond particles that form the polycrystalline diamond to a selected depth from a bearing surface. In other embodiments, the polycrystalline diamond may be un-leached and include a metal-solvent catalyst (e.g., cobalt, iron, nickel, or alloys thereof) that was used to sinter the precursor diamond particles that form the polycrystalline diamond. In yet another embodiment (as illustrated in FIG. 2B), one or more of the superhard bearing elements 106 may be configured as a superhard compact with a superhard table 112 bonded to a substrate 116. The superhard compact may be a PDC including a cobalt-cemented tungsten carbide substrate (substrate 116) having a polycrystalline diamond table (superhard table 112) that was sintered and bonded to the substrate 116 in a first high-pressure/high-temperature process or bonded to the substrate 116 in a bonding process (e.g., a second high-pressure/high-temperature process). Suitable manufacturing techniques for fabricating polycrystalline diamond and polycrystalline diamond compacts that may be used in the disclosed embodiments are disclosed in U.S. Pat. No. 7,866,418 issued on 11 Jan. 2011, the disclosure of which is incorporated herein, in its entirety by this reference. Additionally, in any of the embodiments disclosed herein, the superhard bearing elements 106 may be substrateless and formed from a polycrystalline diamond body (that may be at least partially leached, substantially fully leached, or un-leached) or other superhard materials. Additionally, in some embodiments, the superhard table 112 may be brazed to the substrate 116 in a high-pressure/high-temperature ("HPHT") process or other non-HPHT process. For example, suitable brazing techniques are disclosed in U.S. application Ser. No. 11/545,929 filed on 10 Oct. 2006, the disclosure of which is incorporated herein, in its entirety by this reference.

Figure 2D:
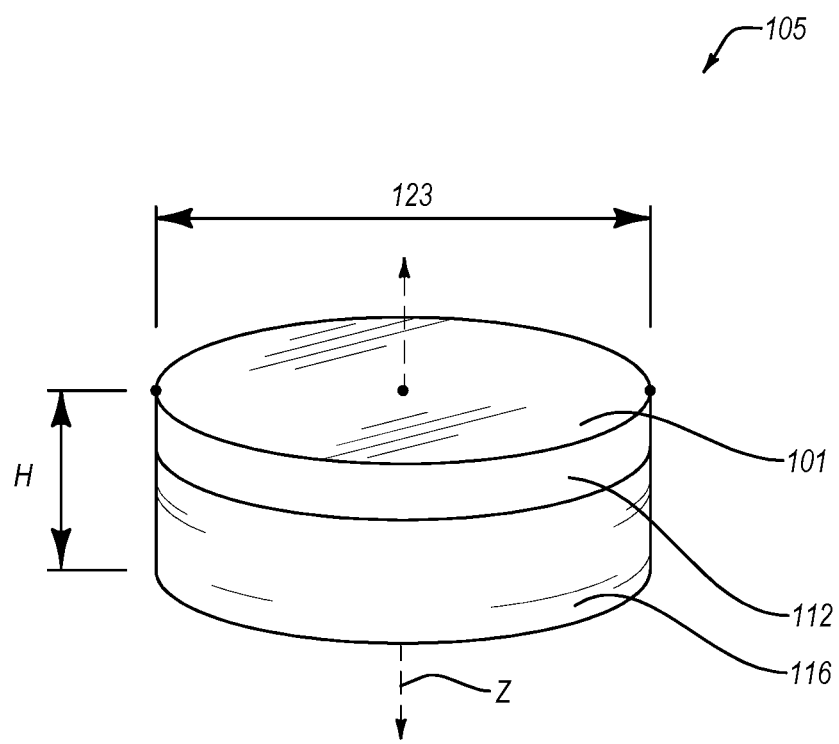
FIG. 2D is an isometric view at the beginning stage of manufacture of superhard bearing elements shown in FIGS. 2A-2C according to an embodiment.
Figure 2E:
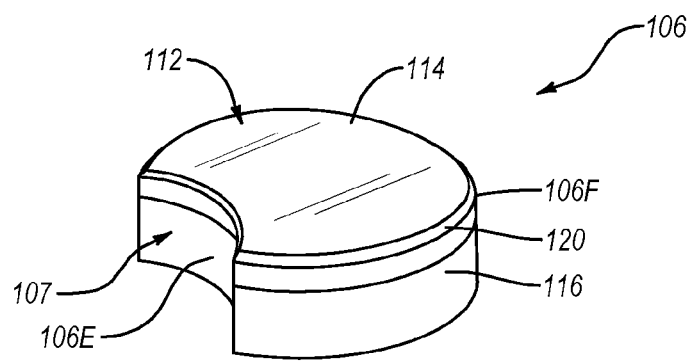
FIG. 2E is an isometric view of one of the superhard bearing elements shown in FIGS. 1A-1C and 2A-2C according to an embodiment.

The diamond particles that may form the polycrystalline diamond in the superhard table 112, as shown in FIGS. 2B, 2D, and 2E, may also exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. Upon sintering the diamond particles to form the polycrystalline diamond, the polycrystalline diamond may, in some cases, exhibit an average grain size that is the same or similar to any of the diamond particles sizes and distributions discussed above. Additionally, in any of the embodiments disclosed herein, the superhard bearing elements 106 may be free-standing (e.g., substrateless) and formed from a polycrystalline diamond body that is at least partially or fully leached to remove a metal-solvent catalyst initially used to sinter the polycrystalline diamond body.

In another embodiment of a method for fabricating a PDC, a layered PCD precursor assembly may be used to form the superhard table 112 shown in FIGS. 2B, 2D, and 2E. The layered PCD precursor assembly may include a first layer of a mass of diamond particles having a fine average particle size (e.g., an average particle size of about 10 μm to about 20 μm, about 12 to about 19 μm, or about 15 μm to about 19.5 μm) adjacent to a second layer of a mass of diamond particles having a coarse average particle size that is greater than the fine average particle size of the first layer (e.g., at least about 40 μm, about 40 μm to about 60 μm, about 30 μm to about 50 μm, about 1.5 to about 4 times the fine average particle size, about 2 to about 2.5 times the fine average particle size, etc.). Although the described embodiment of the PDC precursor assembly only utilizes two layers of diamond particles, two or more, or more than three layers may be employed, with each layer having a progressively smaller average diamond particle size with distance away from the substrate.

The layered PCD precursor assembly may be positioned adjacent to an interfacial surface of a substrate, with the second layer positioned adjacent to the substrate. As previously discussed, the substrate may include a metal-solvent catalyst. The layered PCD precursor assembly and the substrate may be subjected to an HPHT process, such as about 6 GPa to about 9 GPa (e.g., about 6.5 GPa to about 8 GPa) and a temperature of about 1000° C. to about 1400° C. (e.g., about 1100° C. to about 1200° C.). The PDC so-formed includes the superhard table 112 that comprises PCD that is integrally formed with the substrate and bonded to the interfacial surface of the substrate. The superhard table 112 of the PDC so-formed may exhibit two distinct diamond grain layers, a first layer adjacent to the substrate including coarse-sized diamond grains exhibiting a coarse-sized average grain size, and a second layer adjacent to the first layer including fine-sized diamond grains exhibiting a fine-sized average grain size smaller than the coarse-sized average grain size. The average diamond grain sizes may be the same or similar to that of average diamond particle sizes used to form it. For example, an average diamond grain size of the first layer may be the same or similar to that of the coarse diamond particle size of the second layer and the average diamond grain size of the second layer may be the same or similar to that of the fine average particle size of the first layer.

To support the superhard bearing elements 106 of the thrust-bearing assembly 110, the recesses 118 (shown in FIG. 2B) may define a common channel and the superhard bearing elements 106 may be placed therein. In other embodiments, the support ring 102 may define multiple pockets spaced from each other by intervening portions of the support ring 102 or otherwise define locations for the superhard bearing elements 106.

In the illustrated embodiment, each superhard bearing element 106 exhibits an outer convex peripheral surface 106F that is substantially cylindrical and exhibits a convex curvature. Each superhard bearing element 106 also includes a concave boundary or cutout 107 (FIG. 2F) at least partially defined by a concave peripheral surface 106E that is substantially cylindrical and curved to generally correspond to the convex curvature of the outer convex peripheral surface 106F. Each cutout 107 of the plurality of superhard bearing elements 106 is shown in FIG. 2A receiving an adjacent one of the plurality of superhard bearing elements 106. Each of the concave peripheral surfaces 106E of the plurality of superhard bearing elements 106 at least partially defining a corresponding one of the cutouts 107 mates with the outer convex peripheral surface 106F of an adjacent one of the plurality of superhard bearing elements 106. FIGS. 2A-2C illustrate the nesting of the superhard bearing elements 106 to collectively define a substantially continuous superhard bearing surface. FIG. 2C illustrates a top plan view of the thrust-bearing assembly 110 shown in FIGS. 1, 2A, and 2B. In one embodiment, the superhard bearing elements 106 are spaced from each other by a respective gap 117 (shown in FIG. 2C), such that gaps 117 between adjacent ones of the superhard bearing elements 106 are occupied by a portion of the support ring 102, the gap 117 having a dimension of about 5.1 μm to about 510 μm (about 0.00020 inches to about 0.020 inches). For example, the gap 117 may separate adjacent superhard bearing elements 106 by a distance of about 2.5 μm to about 5.1 mm (about 0.00010 inches to about 0.200 inches), or by a distance of about 130 μm to about 250 μm (about 0.005 inches to about 0.01 inches), although the separation distance may be greater or smaller. For instance, as the size of the bearing assembly 110 increases, the size of the superhard bearing elements 106 and/or the size of the respective gap 117 may also increase. Each superhard bearing element 106 includes a discrete superhard bearing surface 114, such that the superhard bearing elements 106 collectively provide a substantially continuous superhard bearing surface.

The superhard bearing surface 114 of each superhard bearing element 106 may be substantially planar and generally lie in a common plane (FIG. 2A) with the bearing surfaces 114 of the other superhard bearing elements 106. The superhard bearing elements 106 may be pre-machined to tolerances before mounting into the corresponding recesses 118 (shown in FIG. 2B) of the support ring 102. The superhard bearing surfaces 114 thereof may also be planarized (e.g., by lapping and/or grinding) so that the superhard bearing surfaces 114 are all substantially coplanar. In particular, the superhard bearing surfaces 114 are substantially coplanar with each other and substantially perpendicular to the thrust axis 108. In some embodiments, one or more of the superhard bearing elements 106 may exhibit the peripherally-extending edge chamfer 120. However, in other embodiments, a portion of the peripherally-extending edge chamfer 120 or all of the peripherally extending edge chamfer 120 may be omitted.

In other embodiments, a retention ring (not shown) may be configured to secure the superhard bearing elements 106 between the support ring 102 and the retention ring as disclosed in U.S. Pat. Nos. 7,870,913 and 8,069,933, the disclosures of which are incorporated herein, in their entirety, by this reference.

FIG. 2D is an isometric view during the manufacture of the superhard bearing elements 106 shown in FIG. 1A, and FIGS. 2A-2C according to an embodiment. The superhard bearing elements 106 may be manufactured from a generally cylindrical insert 105 having a predetermined height H, a top generally circular face 101, and a longitudinal axis Z. The cylindrical insert 105 may be configured as a superhard compact with a superhard table 112 bonded to a substrate 116 made from any of the previously discussed materials and/or methods. For example, the cylindrical insert 105 may be configured and fabricated as disclosed in U.S. Pat. No. 7,866,418 issued on 11 Jan. 2011, or U.S. application Ser. No. 11/545,929, filed on 10 Oct. 2006, the disclosure both of which is incorporated herein, in its entirety by this reference.

Figure 2F:
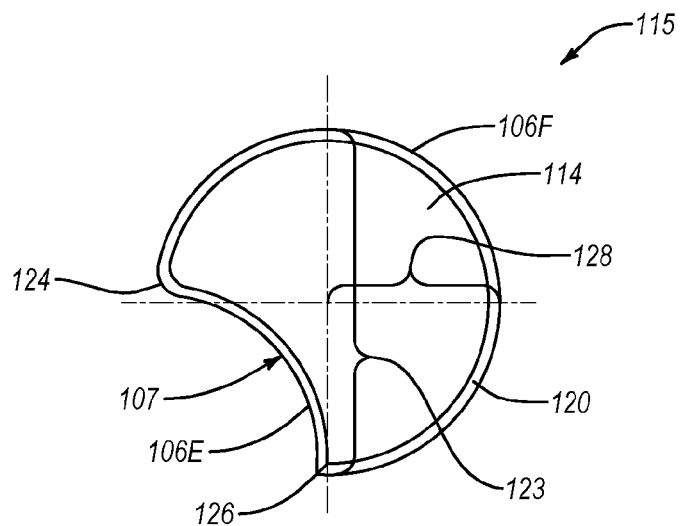
FIG. 2F is a top plan view of the superhard bearing element shown in FIG. 2E.

As shown in FIG. 2D, the top generally circular face 101 of the cylindrical insert 105 may exhibit a diameter 123. In an embodiment, the cutouts 107 of superhard bearing elements 106 may be manufactured by CNC milling, electro-discharge machining ("EDM"), laser-cutting, grinding, traditional milling, combinations thereof, or the like to selectively remove material from the cylindrical insert 105 and shape the cutout 107 as shown in FIGS. 2E and 2F. For example, suitable laser-cutting techniques are disclosed in U.S. application Ser. No. 13/166,007, the disclosure of which is incorporated herein, in its entirety, by this reference.

FIG. 2E is an isometric view of one of the superhard bearing elements 106 removed from the support ring 102 as shown in FIGS. 1A-1C and 2A-2C. FIG. 2E illustrates in more detail the superhard bearing element 106 shown in FIG. 2C including the superhard table 112 and the substantially planar bearing surface 114. The superhard table 112 may be bonded or attached to the corresponding substrate 116. The superhard bearing elements 106 may have a generally cylindrical geometric shape with the cutout 107 at least partially defining the recess, which is at least partially defined by the concave lateral surface 106E. In an embodiment, the cutouts 107 may have a substantially constant radius of curvature, thereby forming an arc along the first concave surface 106E.

The cutouts 107 may have any of a variety of sizes. For example, one or more of the cutouts 107 may have an arc diameter larger or smaller than an average diameter 123 (shown in FIGS. 2D and 2F) of the superhard bearing elements 106. In an embodiment, the arc diameter of the cutouts 107 may be about sixty (60) percent to one hundred thirty (130) percent; about seventy (70) percent to one hundred ten (110) percent; about one hundred (100) percent to one hundred ten (110) percent; or about eighty (80) percent to one hundred (100) percent of the average diameter of the superhard bearing elements 106. Optionally, one or more of the superhard bearing elements 106 may exhibit a peripherally-extending edge chamfer 120 as shown in FIGS. 2A-2G. However, in other embodiments, the edge chamfer 120 may be omitted.

FIG. 2F illustrates a top plan view of the superhard bearing element 106 in detail. FIG. 2F shows the cutout 107 of each of the superhard bearing elements 106 including an arc diameter less than approximately an average radius 128 of each of the superhard bearing elements 106. However, in another embodiment, the cutout 107 of each of the superhard bearing elements 106 may include an arc diameter less than approximately an average diameter 123 of each of the superhard bearing elements 106.

As illustrated in FIG. 2F, the cutout 107 of each of the superhard bearing elements 106 may include two corners 124 and 126 each defined by the meeting of the concave peripheral surface 106E and the convex peripheral surface 106F. In an embodiment, one or both of the two corners 124 and 126 of the cutout 107 of each of the superhard bearing elements 106 may include a radius. In the embodiment illustrated in FIG. 2F, corner 124 is shown to include a radius, while corner 126 is shown to include a mitered chamfered cut. In another embodiment, both corners 124 and 126 may include a mitered chamfered cut. In another embodiment, both corners 124 and 126 may include a chamfer or a radius.

Figure 2G:
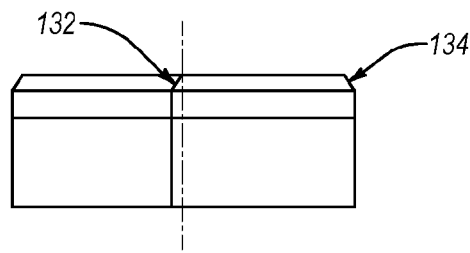
FIG. 2G is a side view of the superhard bearing element shown in FIGS. 2A-2F illustrating a peripherally-extending edge chamfer.

FIG. 2G illustrates a side view of the superhard bearing element 106 shown in FIGS. 2A-2F. Optionally, one or more of the superhard bearing elements 106 may exhibit a peripherally-extending edge chamfer 120, as shown in FIGS. 2E-2G. For example, the chamfer 120 and/or chamfer 132 may be formed as a ground chamfer 134 or by EDM, laser-cutting, or otherwise machining.

Figure 3A:
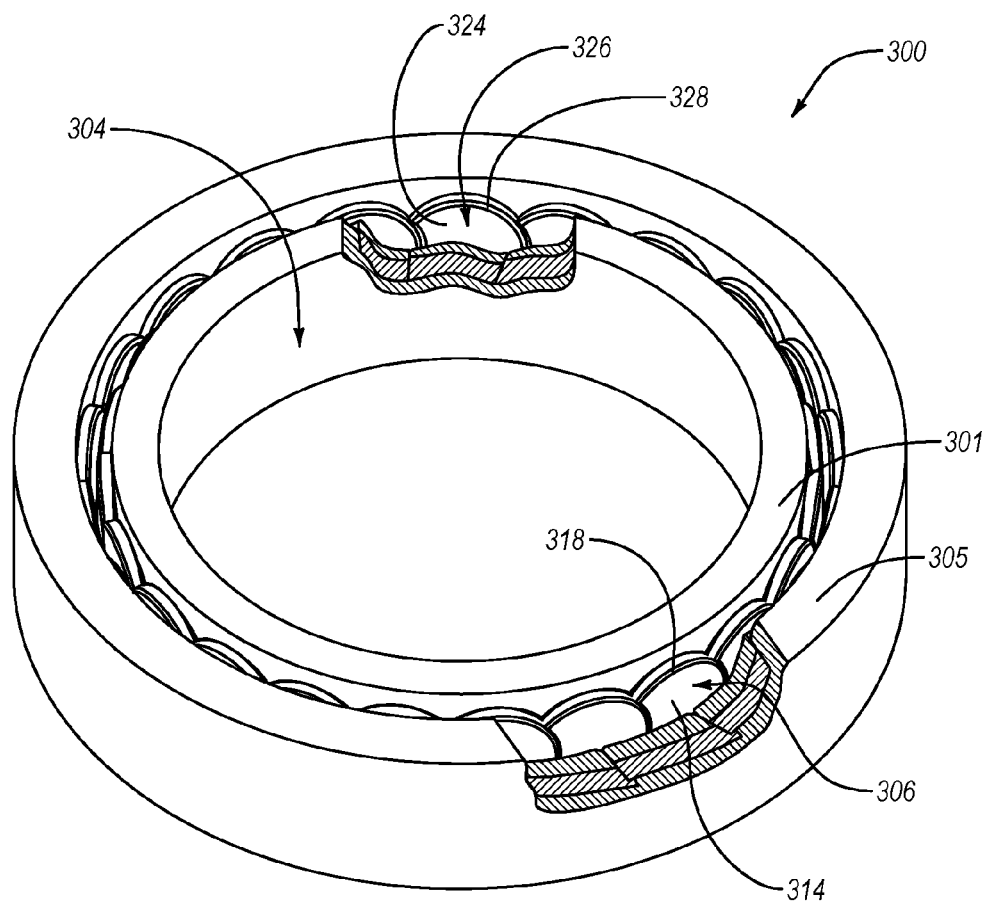
FIG. 3A is an isometric cutaway view of a radial bearing apparatus according to an embodiment.
Figure 3B:
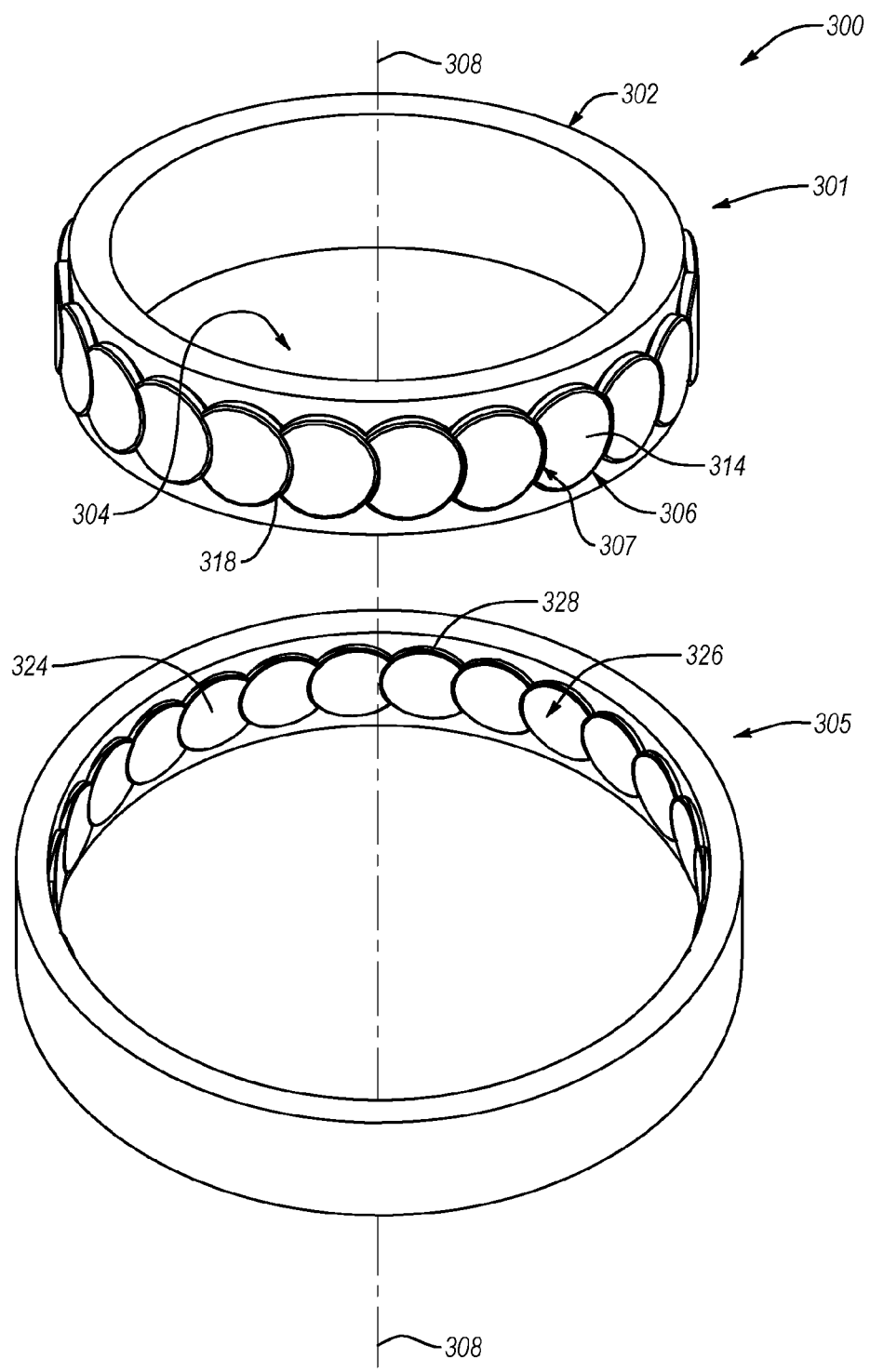
FIG. 3B is an exploded isometric view of the radial bearing apparatus shown in FIG. 3A.

FIGS. 3A and 3B are isometric cutaway and exploded isometric views, respectively, of a radial bearing apparatus 300 according to an embodiment. FIG. 3E illustrates an isometric view of the radial bearing assembly 301 shown in FIGS. 3A and 3B according to an embodiment, which shows the structure of the radial bearing assembly 301 in more detail.

Referring back to FIGS. 3A and 3B, the radial bearing apparatus 300 may include an inner race 301 (i.e., a stator) that may be configured as a radial bearing assembly 301. The inner race 301 may define an opening 304 and may include a plurality of circumferentially distributed superhard bearing elements 306, each of which includes a convexly-curved bearing surface 314 and an optional peripherally-extending edge chamfer 318. The radial bearing apparatus 300 may further include an outer race 305 (i.e., a rotor) that extends about and receives the inner race 301. The outer race 305 may include a plurality of circumferentially distributed superhard bearing elements 326, each of which may include an optional peripherally-extending edge chamfer 328 and a concavely-curved bearing surface 324 curved to generally correspond to the convexly-curved bearing surfaces 314 of the superhard bearing elements 306. The superhard bearing elements 306 and 326 may be made from any of the superhard materials and structures disclosed herein.

The terms "rotor" and "stator" refer to rotating and stationary components of the radial bearing apparatus 300, respectively. Thus, if the outer race 305 is configured to remain stationary, the outer race 305 may be referred to as the stator and the inner race 301 may be referred to as the rotor.

The radial bearing apparatus 300 may be employed in a variety of mechanical applications including motors, turbines, pumps, or any other device capable of rotating a shaft. For example, so-called "roller cone" rotary drill bits may benefit from a radial bearing apparatus disclosed herein. More specifically, the inner race 301 may be mounted or affixed to a spindle or a roller cone and the outer race 305 may be affixed to an inner bore formed within a cone and that such the outer race 305 and the inner race 301 may be assembled to form a radial bearing apparatus.

As shown in FIG. 3A, the radial bearing apparatus 300 does not include any intervening rolling elements between the superhard bearing surfaces 324 and 314 that can prevent direct contact therebetween. During contact operation, the superhard bearing surfaces 324 and 314 of the plurality of superhard bearing elements 306 and 326 may bear against each other during use, while in hydrodynamic operation a fluid film may at least partially prevent direct contact between the superhard bearing surfaces 324 and 314. In an embodiment, the radial bearing assembly 301 may include features configured to enhance the useful life of the radial bearing assembly 301. For example, the plurality of superhard bearing elements 306 may be configured to collectively define a substantially continuous superhard bearing surface. Moreover, fatigue at the bearing contact surface between the superhard bearing elements 306 and the opposing superhard bearing elements 326 (as shown in FIGS. 3A and 3B) may also be reduced because superhard bearing material does not deform as much as a traditional bearing surface (i.e., steel) due to the superhard bearing material's high modulus of elasticity. In addition, the superhard bearing elements 306 may enhance the general load capacity of the radial bearing assembly 301.

Figure 3C:
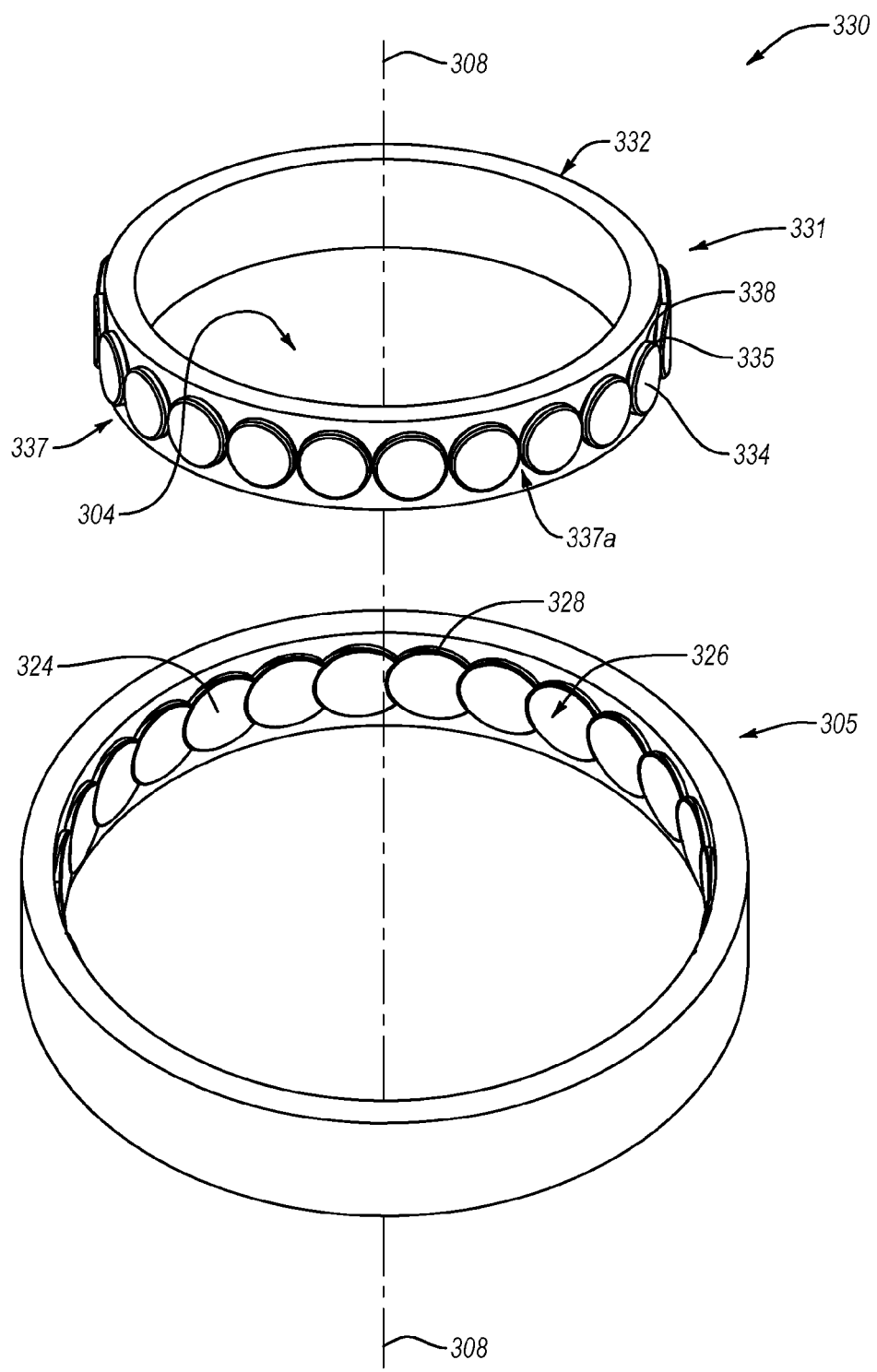
FIGS. 3C and 3D are exploded isometric views of radial bearing apparatus according to various different embodiments.

In another embodiment, FIG. 3C shows an exploded isometric view of a radial bearing apparatus 330. The radial bearing apparatus 330, similar to that of radial bearing apparatus 300 shown in FIGS. 3A and 3B, may include the outer race 305 previously described and an inner race 331 that may be configured as a radial bearing assembly. The inner race 331 may define the opening 304 and may include a plurality of circumferentially distributed superhard bearing elements 337, (similar to superhard bearing elements 122, shown in FIG. 1A) each of which includes a convexly-curved bearing surface 334, and an optional peripherally-extending edge chamfer 335.

In an embodiment, the superhard bearing elements 337 are spaced from each other by a respective gap 337a (shown in FIG. 3C) having a dimension of, for example, about 5.1 μm to about 510 μm (about 0.00020 inches to about 0.020 inches). For example, the gap 337a may separate adjacent superhard bearing elements 337 by a distance of about 2.5 μm to about 5.1 mm (about 0.00010 inches to about 0.200 inches), or by a distance of about 130 μm to about 250 μm (about 0.005 inches to about 0.01 inches), although the separation distance may be greater or smaller. For instance, as the size of the bearing assembly 331 increases, the size of the superhard bearing elements 337 and/or the size of the respective gap 337a may also increase.

Figure 3D:
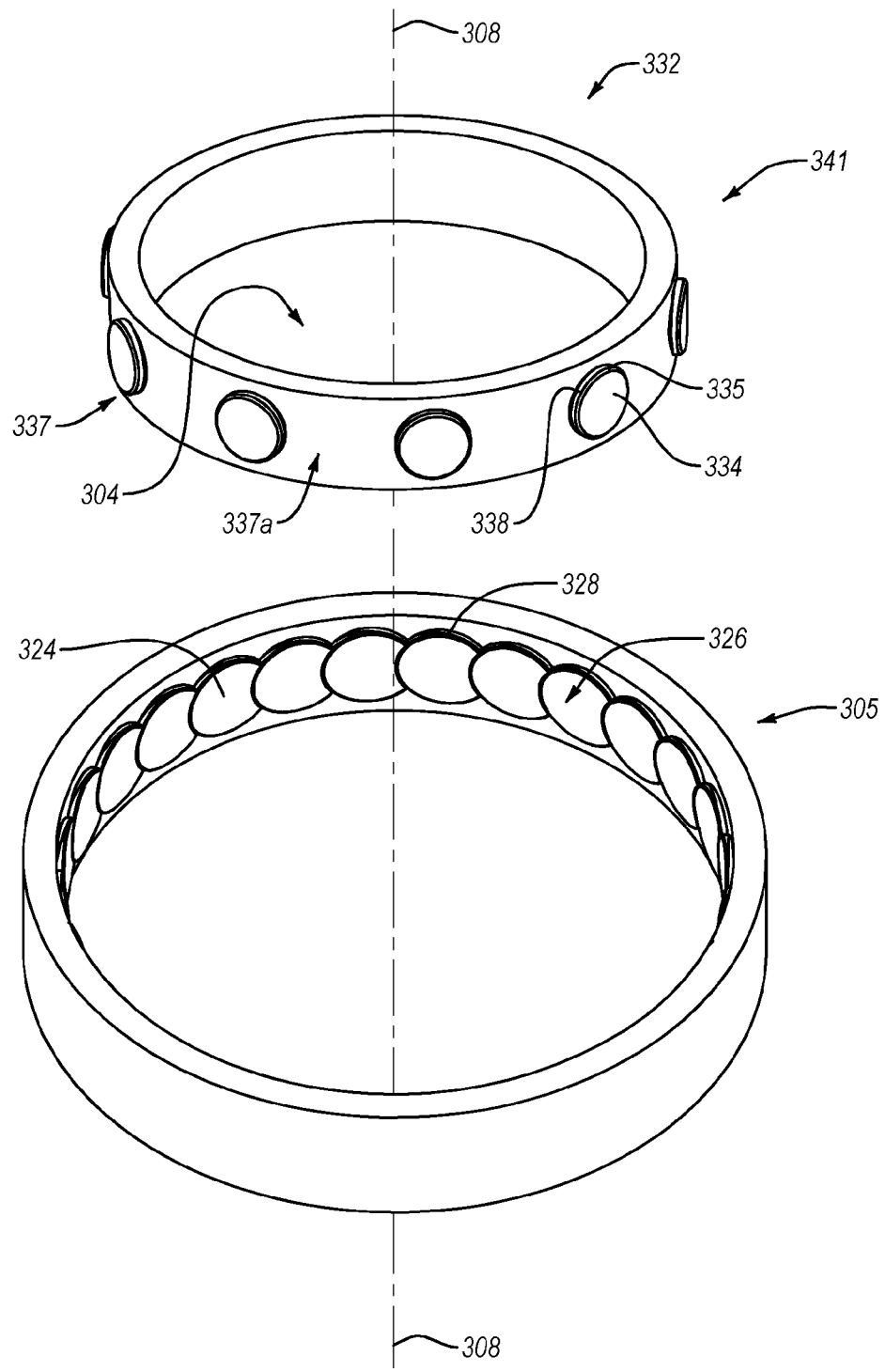
Figure 3E:
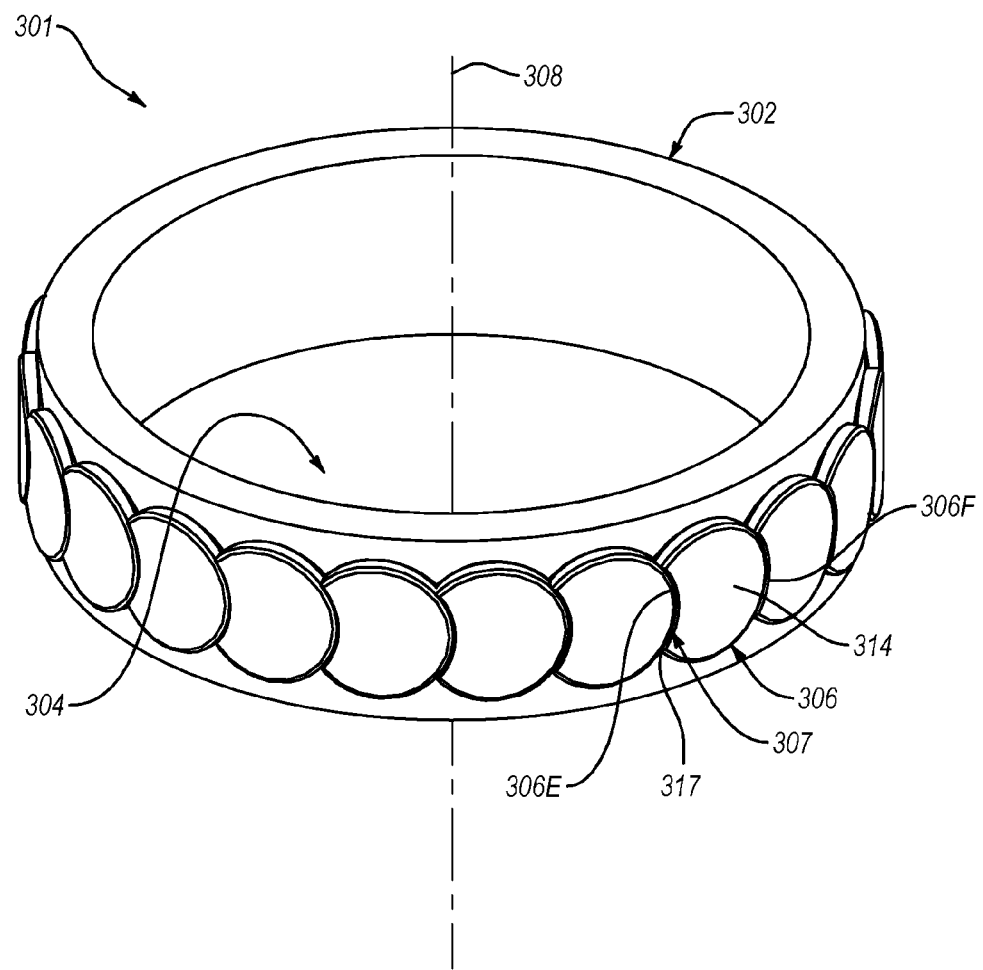
FIG. 3E is an isometric view of a radial bearing assembly according to an embodiment.

In another embodiment shown in FIG. 3D, a radial bearing apparatus 340 according to another embodiment is depicted that is similar to that of the radial bearing apparatus 330. However, the radial bearing assembly 340 includes an inner race 341 in which the superhard bearing elements 337 are relatively more widely spaced than that of the superhard bearing elements 337 shown in FIG. 3C. For example, the superhard bearing elements 337 may be separated from an adjacent superhard bearing element by a gap 337a having a dimension of about 7.6 mm to about 19 mm (about 0.30 inches to about 0.75 inches), such as about 10 mm to about 13 mm (about 0.40 inches to about 0.50 inches). In some embodiments, the gap 337a may be about equal to or greater than an average diameter or other lateral dimension of the superhard bearing elements 337.

It should be noted that in other embodiments, the outer race 305 shown in FIGS. 3A and 3B may include relatively widely-spaced superhard bearing elements similar to that of the inner races 331 and 332 shown in FIGS. 3C and 3D. In such an embodiment, the inner race 301 may still be configured with nested superhard bearing elements.

Referring to FIG. 3E, in the embodiment illustrated in FIGS. 3A and 3B, each of the superhard bearing elements 306 of bearing assembly 301 may be distributed about a rotation axis 308 and mounted in a corresponding recess 310 (shown in FIG. 3G) formed in a support ring 302 or a common slot for all of the superhard bearing elements 306 formed in the support ring 302. The superhard bearing elements 306 may be partially positioned in and secured to the recesses 310 via brazing, welding, soldering, press-fitting, threadly attaching, fastening with a fastener, combinations of the foregoing, or another suitable technique. The superhard bearing elements 306 may be circumferentially distributed about the rotation axis 308 in one row, two rows, three rows, or any number of rows.

Similar to the superhard bearing elements 106 shown in FIGS. 1A and 2A-2C, the superhard bearing elements 306 may have a generally cylindrical geometric shape with a concave boundary or cutout 307 at least partially defining a recess, which is at least partially defined by a concave lateral surface 306E (as shown in FIG. 3C). In an embodiment, the cutouts 307 may have a substantially constant radius of curvature, thereby forming an arc along the first concave surface 306E. The cutouts 307 may also have any of a variety of sizes. For example, one or more of the cutouts 307 may have an arc diameter larger or smaller than an average diameter of the superhard bearing elements 306. In an embodiment, the arc diameter of the cutouts 307 may be about sixty (60) percent to one hundred thirty (130) percent; about seventy (70) percent to one hundred ten (110) percent; or about eighty (80) percent to one hundred (100) percent the average diameter of the superhard bearing elements 306.

In an embodiment, the superhard bearing elements 306 may include a convex lateral surface 306F configured to substantially correspond to the cutout 307. Such a configuration may allow the superhard bearing elements 306 to be positioned on the support ring 302 such that each of the cutout 307 substantially corresponds with the convex lateral surface 306F of an adjacent one of the superhard bearing elements 306 and receives (e.g., nests) the adjacent one of the superhard bearing elements 306. In an embodiment, as shown in FIG. 3E, gaps 317 may be located between adjacent ones of the superhard bearing elements 306. The gaps 317 may be sized and configured such that the opposing superhard bearing elements maintain contact with one or more of the superhard bearing elements 306 as the opposing superhard bearing elements pass over the superhard bearing elements 306. For example, in an embodiment, a width of one or more of the gaps 317 or an average width of the gaps 317 may be about 5.1 μm to about 510 μm (about 0.00020 inches to about 0.020 inches), such as about 130 μm to about 250 μm (about 0.005 inches to about 0.01 inches). In other embodiments, one or more of the gaps 317 may exhibit larger or smaller widths.

Figure 3F:
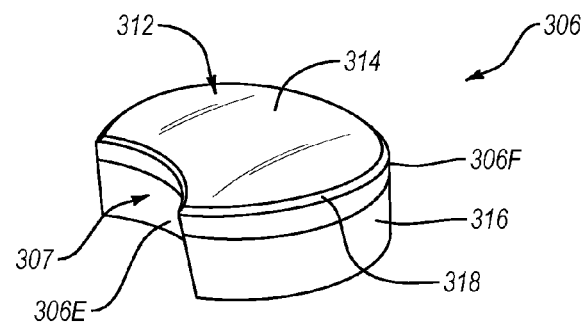
FIG. 3F is an isometric view of one of the superhard bearing elements shown in FIG. 3E according to an embodiment.

FIG. 3F is an isometric view of one of the superhard bearing elements 306 removed from the support ring 302. The superhard bearing element 306 may comprise a superhard table 312 including a convexly-curved bearing surface 314 (e.g., curved to lie on an imaginary cylindrical surface). Each of the superhard table 312 may be bonded or attached to a corresponding substrate 316. Like the superhard bearing elements 106, one or more of the superhard bearing elements 306 may exhibit a peripherally extending edge chamfer 318. However, in other embodiments, the edge chamfer may be omitted.

Figure 3G:
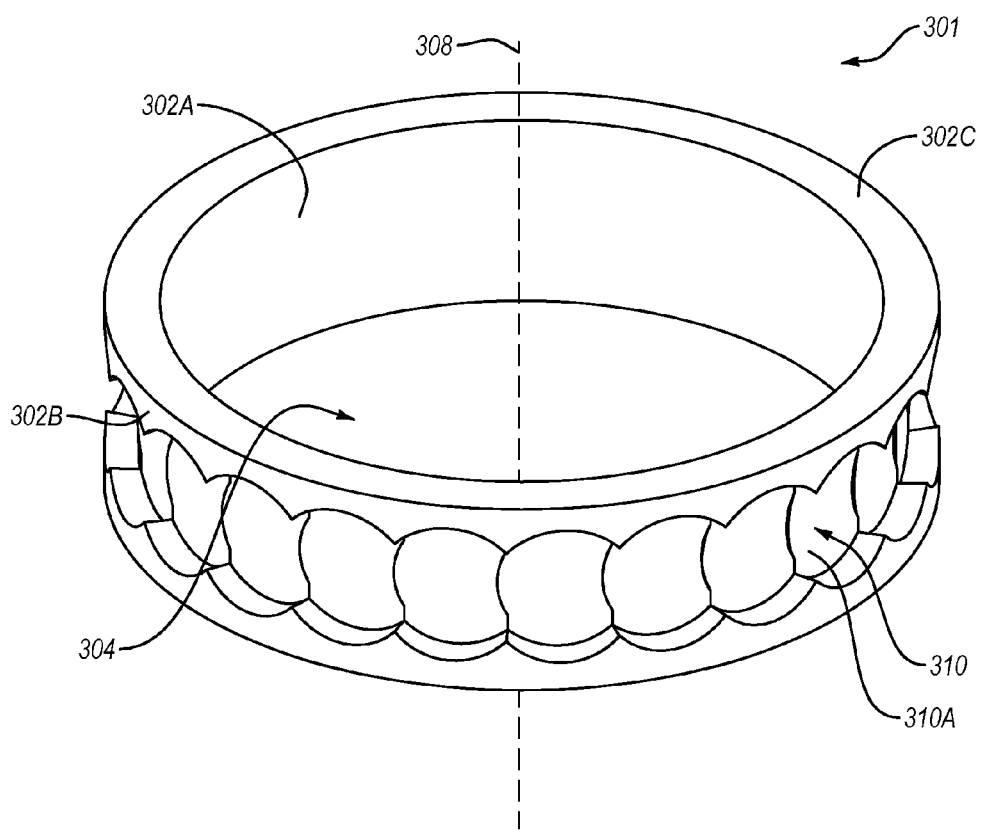
FIG. 3G is an isometric view of the radial bearing assembly shown in FIG. 3E, with the superhard bearing elements removed.

FIG. 3G is an isometric view of the radial bearing assembly 301, with the superhard bearing elements 306 removed. The recesses 310 may include an inclined bottom portion 310A, and may be configured to generally correspond to the geometry of the superhard bearing elements 306. In an embodiment, the recesses 310 may be configured and spaced in the support ring 302 to partially overlap such that adjacent superhard bearing elements 306 substantially abut one another and form a substantially continuous bearing surface. In other embodiments, the recesses 310 on the support ring 302 may be configured and spaced such that adjacent superhard bearing elements 306 do not abut each other.

Figure 3H:
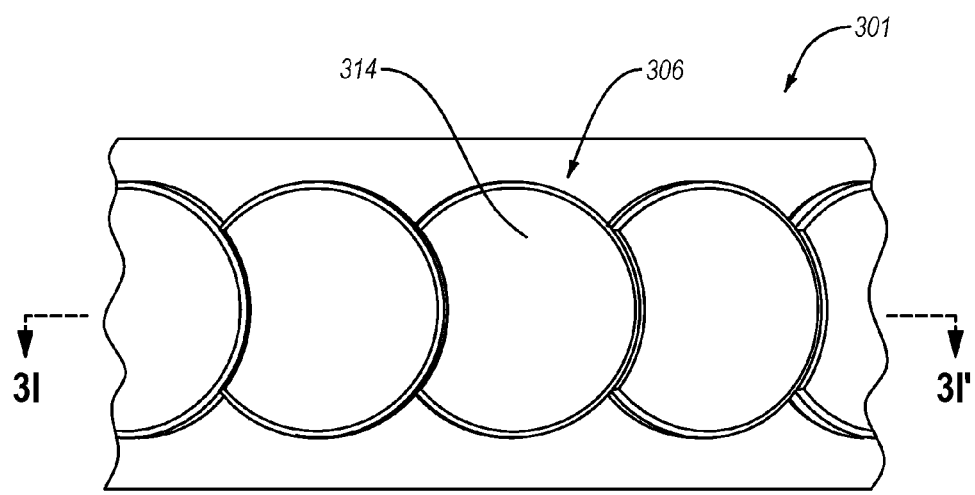
FIG. 3H is a side plan view of the radial bearing assembly shown in FIGS. 3A and 3B.
Figure 3I:
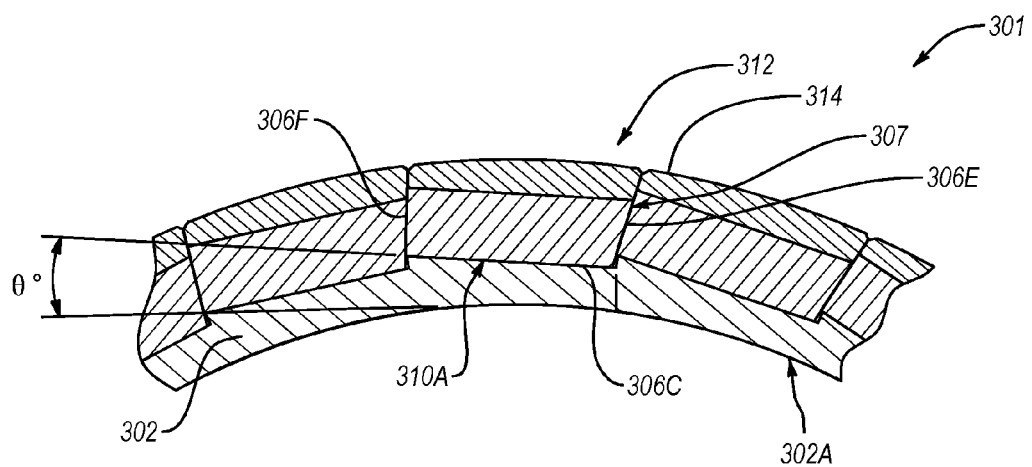
FIG. 3I is a cross-sectional view taken along line 3I-3I' of the radial roller bearing assembly shown in FIGS. 3A, 3B and 3H.

FIG. 3H is a partial side plan view of the radial bearing assembly 301 shown in FIGS. 3A, 3B, and 3E, and FIG. 3I is partial cross-sectional view of the radial bearing assembly 301 shown in FIG. 3H taken along line 31-31'. In an embodiment, the recesses 310 and the superhard bearing elements 306 may be configured to help secure the superhard bearing elements 306 to the support ring 302. For example, the recesses 310 may be formed such that the inclined bottom portion 310A of each of the recesses 310 forms an oblique angle θ relative to the inner surface 302A (see FIGS. 3G and 3I) of the support ring 302 or the rotation axis 308. In an embodiment, the angle θ may be about 1 degree to 45 degrees; about 5 degrees to 40 degrees; about 10 degrees to 35 degrees, or about 15 degrees to 30 degrees relative to the inner surface 302A. In other embodiments, the inclined bottom portion 310A of the recesses 310 (shown in FIGS. 3G and 3I) may form either a larger or smaller angle relative to the inner surface 302A. The recesses 310 may be machined by CNC milling, electro-discharge machining ("EDM"), laser-cutting, grinding, traditional milling, combinations thereof, or the like.

Similarly, at least some of the superhard bearing elements 306 may be formed such that the first concave surface 306E is obliquely angled relative to a bottom surface 306C of the superhard bearing elements 306. The angle (shown in FIG. 3I) between the first concave surface 306E and the bottom surface 306C may be about 95 degrees to 135 degrees, about 100 degrees to 130 degrees, about 105 degrees to 125 degrees, or about 110 degrees to 120 degrees. In other embodiments, the angle may be larger or smaller. The angled surface may be formed by EDM, laser-cutting, grinding, combinations thereof, or otherwise machining the superhard bearing elements 306.

By angling the first concave surfaces 306E of the superhard bearing elements 306 relative to the bottom surfaces 306C, the superhard bearing elements 306 may be positioned on the inclined bottom portions 310A of the recesses 310 such that the bearing surfaces 314 of the superhard bearing elements 306 are arranged along an imaginary generally cylindrical surface. In addition, the first concave surfaces 306E of the superhard bearing elements 306 may interlock with the convex lateral surfaces 306F of adjacent ones of the superhard bearing elements 306 to help secure the superhard bearing elements 306 within the support ring 302.

It should be noted that the outer race 305 may be structured similarly to that of the inner race 301. In the interest of brevity, the manner in which the superhard bearing elements 326 are mounted is not discussed again in detail. However, bearing elements 326 may be mounted according to any of the embodiments disclosed herein.

Figure 4:
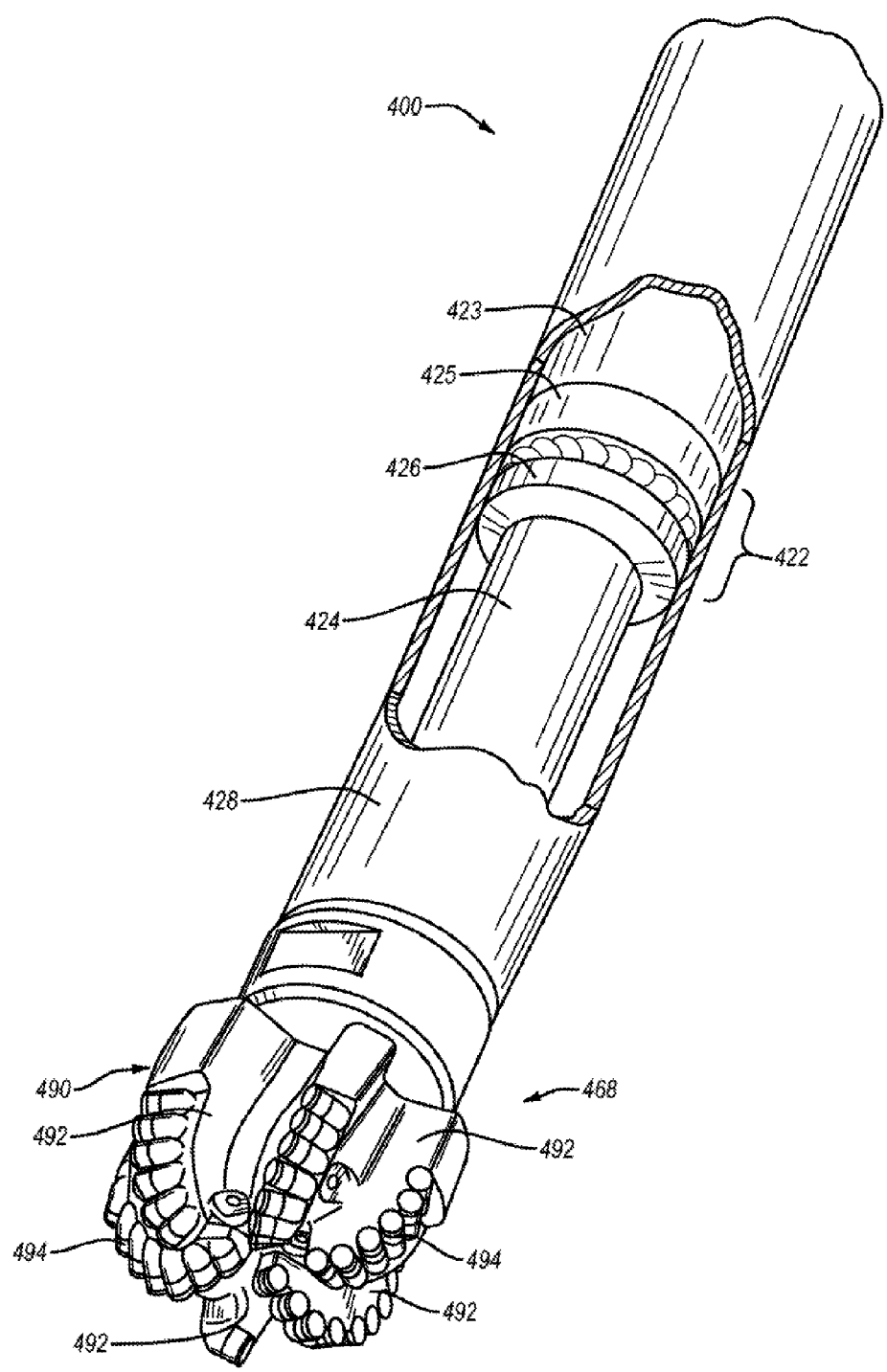
FIG. 4. is a schematic isometric cutaway view of a subterranean drilling system including a thrust-bearing apparatus utilizing any of the previously described bearing assemblies according to various embodiments.

FIG. 4 is a schematic isometric cutaway view of a subterranean drilling system 400 according to an embodiment. The subterranean drilling system 400 may include a housing 428 enclosing a downhole drilling motor 423 (i.e., a motor, turbine, or any other device capable of rotating an output shaft) that may be operably connected to an output shaft 424. A thrust-bearing apparatus 422 may be operably coupled to the downhole drilling motor 423 for carrying thrust loads during drilling operations. The thrust-bearing apparatus 422 may be configured as any of the previously described thrust-bearing apparatus embodiments. A rotary drill bit 468 may be configured to engage a subterranean formation and drill a borehole and may be connected to the output shaft 424. The rotary drill bit 468 is shown as a fixed cutter drill bit including a bit body 490 having radially-extending and longitudinally-extending blades 492 with a plurality of PDCs 494 secured to the blades 492. However, other embodiments may utilize different types of rotary drill bits, such as core bits and/or roller-cone bits. As the borehole is drilled, pipe sections may be connected to the subterranean drilling system 400 to form a drill string capable of progressively drilling the borehole to a greater depth within the earth.

The thrust-bearing apparatus 422 may include a stator 425 that does not rotate and a rotor 426 that may be attached to the output shaft 424 and rotates with the output shaft 424. As discussed above, the thrust-bearing apparatus 422 may be configured as any of the embodiments disclosed herein. For example, the stator 425 may include a plurality of circumferentially-distributed superhard bearing elements similar to those shown and described in the thrust-bearing assembly 110 of FIG. 1. The rotor 426 may include a plurality of circumferentially-distributed superhard bearing elements (not shown) as described, for example, in the thrust-bearing assembly 110 or 120 of FIG. 1.

In operation, lubricating fluid may be circulated through the downhole drilling motor 423 to generate torque and rotate the output shaft 424 and the rotary drill bit 468 attached thereto so that a borehole may be drilled. A portion of the lubricating fluid may also be used to lubricate opposing bearing surfaces of the stator 425 and the rotor 426.

Although the thrust-bearing assemblies and apparatuses described above have been discussed in the context of subterranean drilling systems and applications, it should be understood that such thrust-bearing assemblies and apparatuses are not limited to such use and could be used within a bearing assembly or apparatus for varied applications, if desired, without limitation. Thus, such thrust-bearing assemblies and apparatuses are not limited for use with subterranean drilling systems and may be used with various other mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing apparatus, comprising:
a first bearing assembly including a plurality of first superhard bearing elements each of which includes a first superhard bearing surface, each of the first superhard bearing elements spaced from immediately circumferentially adjacent superhard bearing elements of the plurality of first superhard bearing elements by a distance that is about equal to or greater than an average lateral dimension of the plurality of the first superhard bearing elements; and
a second bearing assembly including a plurality of second superhard bearing elements generally opposing and bearing against the plurality of first superhard bearing elements of the first bearing assembly during operation and a support ring that carries the plurality of second superhard bearing elements, the plurality of second superhard bearing elements distributed circumferentially about a rotation axis, more than one of the plurality of second superhard bearing elements including:
a second superhard bearing surface;
an outer convex peripheral surface that is substantially cylindrical and exhibits a convex curvature;
a cutout at least partially defined by a concave peripheral surface that is substantially cylindrical and curved to generally correspond to the convex curvature of the outer convex peripheral surface; and
wherein the cutout receives a portion of an adjacent one of the plurality of second superhard bearing elements; and
wherein the second superhard bearing surfaces of the more than one of the plurality of second superhard bearing elements collectively define a bearing surface that is substantially perpendicular or substantially parallel to the rotation axis.

2. The bearing apparatus of claim 1 wherein the second superhard bearing surfaces of the second superhard bearing elements collectively define a substantially continuous superhard bearing surface.

3. The bearing apparatus of claim 1 wherein each of the concave peripheral surfaces abuts the outer convex peripheral surface of an adjacent one of the plurality of second superhard bearing elements.

4. The bearing apparatus of claim 3 wherein each of the concave peripheral surfaces abuts the outer convex peripheral surface of an adjacent one of the plurality of second superhard bearing elements such that a gap exists between at least one of the concave peripheral surfaces and an adjacent one of the convex peripheral surfaces.

5. The bearing apparatus of claim 1 wherein the second superhard bearing surfaces of the plurality of second superhard bearing elements are substantially coplanar with each other.

6. The bearing apparatus of claim 1 wherein the first and second bearing assemblies define a thrust-bearing apparatus or a radial bearing apparatus.

7. The bearing apparatus of claim 1 wherein each of the plurality of second superhard bearing elements comprises a substrate and a superhard table bonded to the substrate.

8. The bearing apparatus of claim 7 wherein the superhard table comprises polycrystalline diamond.

9. The bearing apparatus of claim 1 wherein each of the plurality of second superhard bearing elements is brazed, interference-fitted, or fastened to the support ring.

10. The bearing apparatus of claim 1 wherein each of the second superhard bearing surfaces comprises a concavely-curved bearing surface or a convexly-curved bearing surface.

11. The bearing apparatus of claim 1 wherein at least some of the plurality of second superhard bearing elements include a chamfered edge.

12. The bearing apparatus of claim 1 wherein the cutout includes an arc diameter, wherein the arc diameter is less than approximately an average diameter of the plurality of second superhard bearing elements.

13. The bearing apparatus of claim 1 wherein the cutout includes two corners each defined by the intersection of the concave peripheral surface and the convex peripheral surface.

14. The bearing apparatus of claim 13 wherein at least one of the two corners of the cutout of each of the plurality of second superhard bearing elements is rounded.

15. The bearing apparatus of claim 1 wherein the first bearing assembly is configured as a stator and the second bearing assembly is configured as a rotor.

16. The bearing apparatus of claim 1 wherein each of the plurality of second superhard bearing elements are spaced from each other by a respective gap, the respective gap having a dimension of about 2.5 µm to about 5.1 mm.

17. The bearing apparatus of claim 1 wherein the plurality of first superhard bearing surfaces of the first bearing assembly are spaced from the plurality of second superhard bearing surfaces of the second bearing assembly by a fluid film during hydrodynamic operation.

18. The bearing apparatus of claim 1 wherein the rotation axis is a thrust axis.

19. The bearing apparatus of claim 1 wherein the more than one of the plurality of second superhard bearing elements includes a bottom surface that is spaced from the second superhard bearing surface, wherein the concave peripheral surface is obliquely angled relative to the bottom surface.

20. A method of operating a bearing apparatus, comprising:
rotating a first bearing assembly relative to a second bearing assembly;
wherein at least one of the first or second bearing assemblies includes:
a plurality of first superhard bearing elements each of which includes a first superhard bearing surface, each of the first superhard bearing elements spaced from immediately circumferentially adjacent superhard bearing elements of the plurality of first superhard bearing elements by a distance that is about equal to or greater than an average lateral dimension of the plurality of the first superhard bearing elements; and
wherein the other of the first or second bearing assemblies includes:
a support ring; and
a plurality of second superhard bearing elements carried by the support ring, more than one of the plurality of second superhard bearing elements including:
a second superhard bearing surface that bears against the first superhard bearing surface;
an outer convex peripheral surface that is substantially cylindrical and exhibits a convex curvature; and
a cutout at least partially defined by a concave peripheral surface that is substantially cylindrical and curved to generally correspond to the convex curvature of the outer convex peripheral surface;
wherein the cutout receives a portion of an adjacent one of the plurality of superhard bearing elements; and
wherein the second superhard bearing surfaces of the more than one of the plurality of second superhard bearing elements collectively define a bearing surface that is substantially perpendicular or substantially parallel to a rotation axis.

21. A motor assembly for use in drilling subterranean formations, comprising:
a motor operable to apply torque to a rotary drill bit, the motor operably coupled to a bearing apparatus, the motor spaced from the rotary drill bit, the bearing apparatus including a rotor and a stator; and
wherein the stator or the rotor comprises:
a support ring; and
a plurality of first superhard bearing elements carried by the support ring, more than one of the plurality of first superhard bearing elements including:
a superhard bearing surface that bears against another bearing surface during operation;
an outer convex peripheral surface that is substantially cylindrical and exhibits a convex curvature; and
a cutout at least partially defined by a concave peripheral surface that is substantially cylindrical and curved to generally correspond to the convex curvature of the outer convex peripheral surface;
wherein the cutout receives a portion of an adjacent one of the plurality of first superhard bearing elements;
wherein the superhard bearing surfaces of the more than one of plurality of first superhard bearing elements collectively define a bearing surface that is substantially perpendicular or substantially parallel to a rotation axis; and
wherein the other of the stator or the rotor includes a plurality of second superhard bearing elements that are spaced from immediately circumferentially adjacent second superhard bearing elements of the plurality of second superhard bearing elements by a distance that is about equal to or greater than an average lateral dimension of the plurality of the second superhard bearing elements.

* * * * *